US012620839B2

(12) United States Patent
Oshima et al.

(10) Patent No.: US 12,620,839 B2
(45) Date of Patent: May 5, 2026

(54) SYSTEM FOR PROMOTING LENDING OR BORROWING OF PORTABLE ELECTRIC POWER SUPPLY

(71) Applicant: HONDA MOTOR CO., LTD., Tokyo (JP)

(72) Inventors: Ryo Oshima, Wako (JP); Sho Takada, Wako (JP); Nobuyuki Sasaki, Wako (JP); Mitsuhiro Ito, Wako (JP); Mio Oshima, Wako (JP); Yoshihiro Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1121 days.

(21) Appl. No.: 17/021,039

(22) Filed: Sep. 15, 2020

(65) Prior Publication Data

US 2020/0408549 A1     Dec. 31, 2020

Related U.S. Application Data

(63) Continuation of application No. PCT/JP2018/044961, filed on Dec. 6, 2018.

(30) Foreign Application Priority Data

Mar. 20, 2018     (JP) ................................. 2018-052598

(51) Int. Cl.
H02J 50/80          (2016.01)
G06F 16/9035       (2019.01)
(Continued)

(52) U.S. Cl.
CPC ............ H02J 50/80 (2016.02); H02J 7/0048 (2020.01); H02J 7/005 (2020.01); H02J 50/90 (2016.02);
(Continued)

(58) Field of Classification Search
CPC .......... H02J 50/80; H02J 50/90; H02J 7/0048; H02J 7/005; H02J 13/00004; G06F 16/9035; G01C 21/3469
(Continued)

(56) References Cited

U.S. PATENT DOCUMENTS 6,768,909 B1 * 7/2004 Irvin ...................... G01S 5/0009
455/456.6
8,810,192 B2 * 8/2014 Bridges .............. G06Q 30/0202
705/72
(Continued)

FOREIGN PATENT DOCUMENTS

JP       2004-123039 A       4/2004
JP       2011-128871 A       6/2011
(Continued)

OTHER PUBLICATIONS

Hidefumi (English translation of Japaense Patent Document No. JP-2013-130963-A, published on Jul. 4, 2013, machine translated on Apr. 7, 2024 by Japan Patent Office translation tool, 45 pages). (Year: 2013).*
(Continued)

*Primary Examiner* — Phallaka Kik
(74) *Attorney, Agent, or Firm* — WHDA, LLP

(57)          ABSTRACT

A system for promoting lending and borrowing of portable electrical energy storage devices is provided. The system acquires status information indicating an amount of stored electrical energy of the portable electrical energy storage devices and position information indicating a geographic position of it. The system extracts, from a user database, position information or a communication address of a portable electrical energy storage device of which stored electrical energy is sufficient on the basis of the status information, and extracts, from the user database, a communication address of a user of a portable electrical energy storage (Continued)

SERVER          41
CPU
43
ELECTRICAL ENERGY STORAGE INFORMATION COLLECTION UNIT
45
AUTHENTICATION PROCESSING UNIT
46
INFORMATION PROVIDING UNIT
47
QUERY UNIT
48
RESPONSE RECEPTION UNIT
53
COMMUNICATION CIRCUIT

EXTRACTION UNIT          44
50
FIRST EXTRACTION UNIT
51
SECOND EXTRACTION UNIT
52
THIRD EXTRACTION UNIT
49
DETERMINATION UNIT

STORAGE DEVICE          42
54
USER DB
55
CONTROL PROGRAM

5 device of which stored electrical energy is insufficient on the basis of the status information, and transmits information including extracted position information or a extracted communication address.

12 Claims, 13 Drawing Sheets

(51) Int. Cl.

| | |
|---|---|
| *H02J 7/00* | (2006.01) |
| *H02J 50/90* | (2016.01) |
| *G01C 21/34* | (2006.01) |
| *H02J 13/00* | (2006.01) |

(52) U.S. Cl.
CPC ...... *G01C 21/3469* (2013.01); *G06F 16/9035* (2019.01); *H02J 13/00004* (2020.01)

(58) Field of Classification Search
USPC ......... 320/134, 136, 108, 109, 110, 112, 114
See application file for complete search history.

(56) References Cited

U.S. PATENT DOCUMENTS

| | | | | |
|---|---|---|---|---|
| 10,040,359 | B2 | 8/2018 | Chen et al. | |
| 10,278,039 | B1 * | 4/2019 | Matus | H04W 4/029 |
| 12,166,363 | B2 * | 12/2024 | Leabman | H04B 5/79 |
| 12,192,865 | B2 * | 1/2025 | Matus | H04W 4/40 |
| 2008/0311961 | A1 * | 12/2008 | Cotevino | H04W 52/0261 |
| | | | | 455/574 |
| 2009/0063680 | A1 * | 3/2009 | Bridges | B60L 53/20 |
| | | | | 709/224 |
| 2011/0184888 | A1 * | 7/2011 | Lee | H02J 7/00045 |
| | | | | 320/108 |
| 2011/0246019 | A1 * | 10/2011 | Mineta | B60W 50/0097 |
| | | | | 903/903 |
| 2012/0306446 | A1 * | 12/2012 | Suganuma | B60L 53/30 |
| | | | | 701/119 |
| 2014/0074320 | A1 * | 3/2014 | Nishida | B60H 1/00657 |
| | | | | 701/2 |
| 2014/0206411 | A1 * | 7/2014 | Ruutu | H04W 64/00 |
| | | | | 455/522 |
| 2014/0303826 | A1 * | 10/2014 | Kobayashi | B60L 58/10 |
| | | | | 701/22 |
| 2017/0025900 | A1 * | 1/2017 | Amari | H02J 50/12 |
| 2018/0059258 | A1 * | 3/2018 | MacLaughlin | G01T 1/175 |
| 2018/0077538 | A1 * | 3/2018 | Matus | G08B 25/016 |
| 2018/0095138 | A1 * | 4/2018 | Newport | G01R 31/3842 |
| 2019/0152340 | A1 * | 5/2019 | Haneda | B60L 53/62 |
| 2019/0202314 | A1 * | 7/2019 | Boeswald | B60L 53/18 |
| 2021/0223404 | A1 * | 7/2021 | Lau | G01S 19/34 |
| 2022/0045554 | A1 * | 2/2022 | Leabman | H02J 50/80 |

FOREIGN PATENT DOCUMENTS

| | | | |
|---|---|---|---|
| JP | 2013-130963 A | 7/2013 | |
| JP | 2013-247854 A | 12/2013 | |
| JP | 2017-123768 A | 7/2017 | |
| JP | 2017-529821 A | 10/2017 | |
| JP | 6219461 B1 * | 10/2017 | B60L 53/11 |
| JP | 2018-18454 A | 2/2018 | |

OTHER PUBLICATIONS

Katsuya et al. (English translation of Japanse Patent Document No. JP-2013-247854-A, published on Dec. 9, 2013, machine translated on Apr. 7, 2024 by Japan Patent Office translation tool, 44 pages). (Year: 2013).*

Satoshi (Machine translation of Japanese Patent Document No. JP-2018-018454-A, published on Feb. 1, 2018, machine translated on Apr. 7, 2024 by Japan Patent Office translation tool, 86 pages). (Year: 2018).*

Haneda (Bib data sheet for JP2018018454A, showing other equivalent published documents including US201915234A1 and JP621946B1, Mahcine translated by Espacenet on Oct. 19, 2024, 2 pages). (Year: 2024).*

International Search Report dated Mar. 5, 2019, issued in counterpart application No. PCT/JP2018/044961, w/English translation (5 pages).

Translation of Written Opinion dated Mar. 5, 2019 issued in counterpart Application No. PCT/JP2018/044961 (13 pages).

* cited by examiner

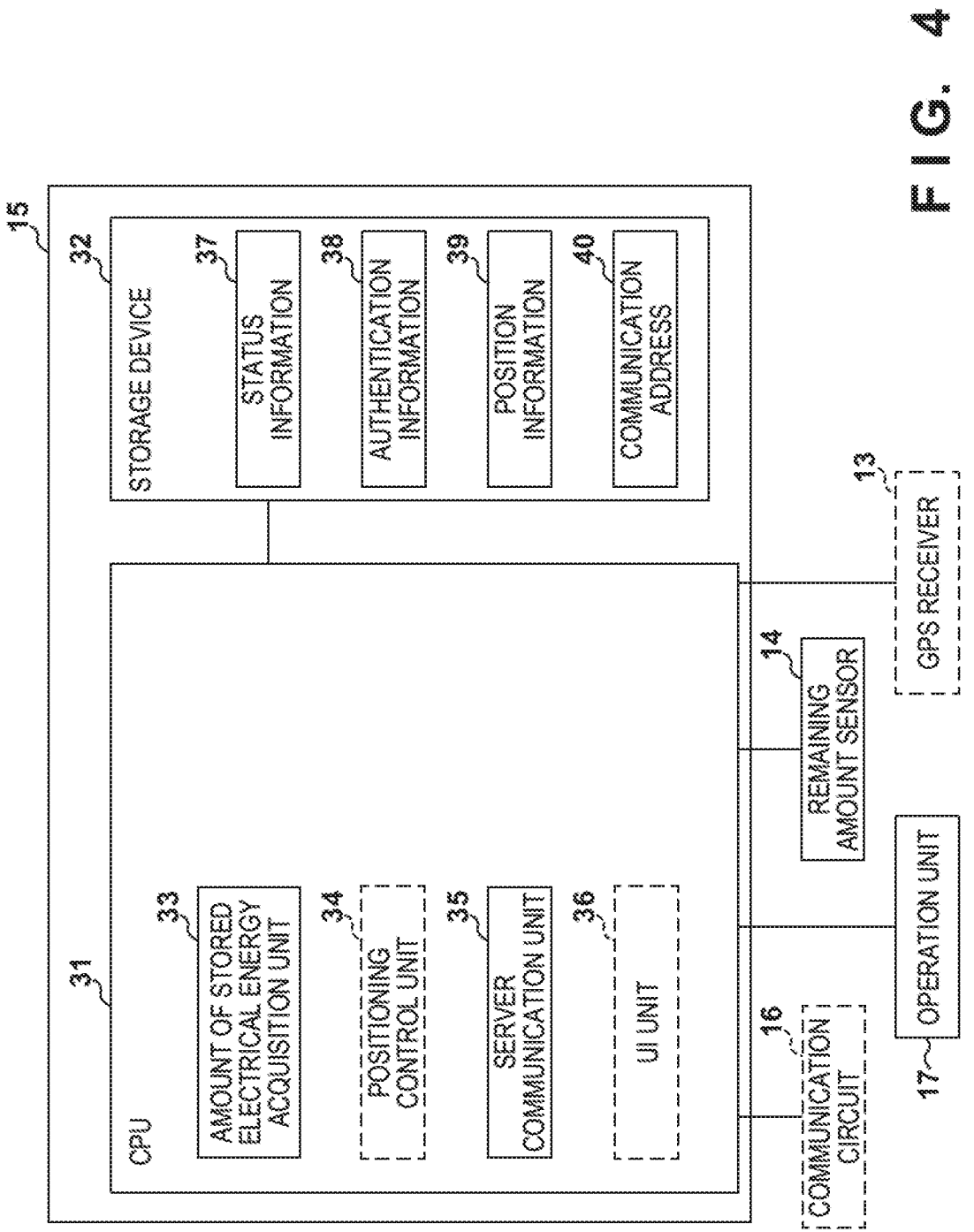
F I G.  4

FIG. 6

| USER ID | PASSWORD | STORAGE BATTERY ID | SPECIFICATION INFORMATION | ELECTRICAL ENERGY STORAGE STATUS | COMMUNI-CATION ADDRESS | POSITION INFORMATION |
|---------|----------|--------------------|--------------------------|----------------------------------|------------------------|----------------------|
| USER a | ********* | 0001 | 200Wh | 20% | aaa@aaa.jp | xa,ya |
| USER b | ********* | 0002 | 300Wh | 98% | bbb@bbb.jp | xb,yb |

54

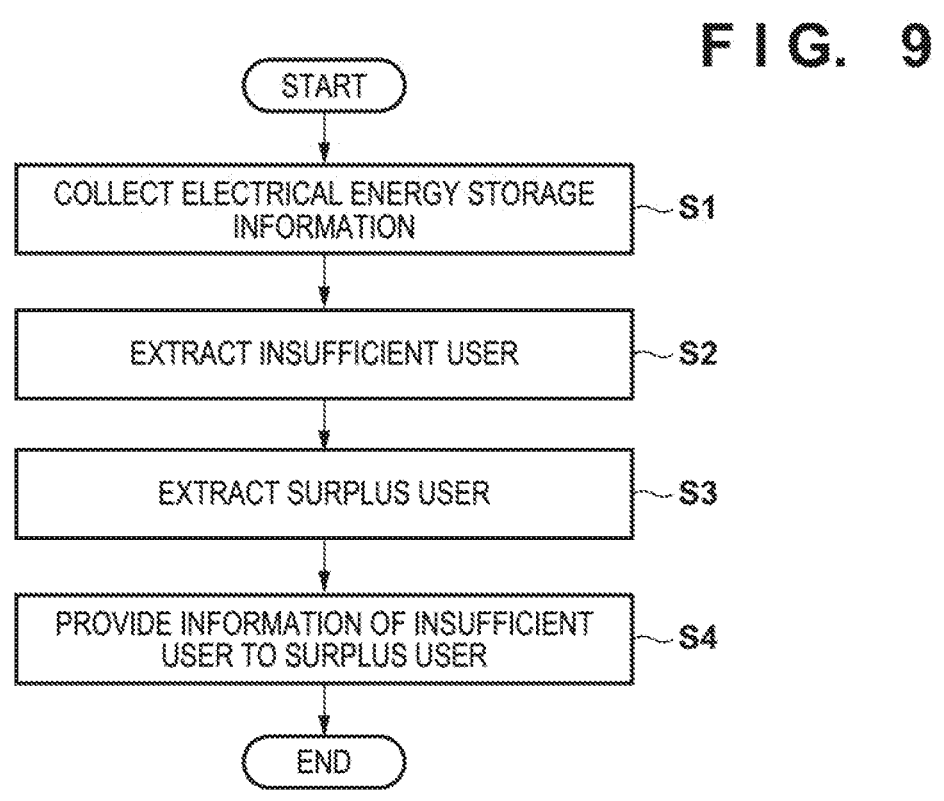
FIG. 9
START
COLLECT ELECTRICAL ENERGY STORAGE
INFORMATION — S1
EXTRACT INSUFFICIENT USER — S2
EXTRACT SURPLUS USER — S3
PROVIDE INFORMATION OF INSUFFICIENT
USER TO SURPLUS USER — S4
END
FIG. 10
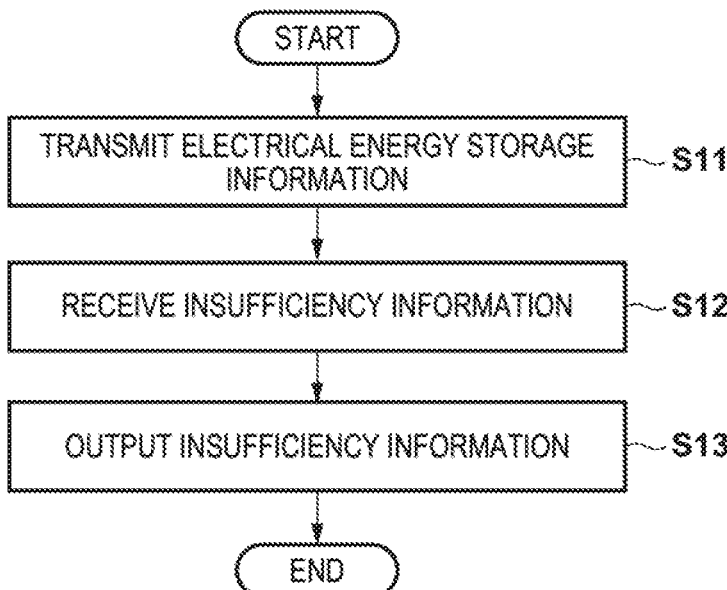
START
TRANSMIT ELECTRICAL ENERGY STORAGE
INFORMATION — S11
RECEIVE INSUFFICIENCY INFORMATION — S12
OUTPUT INSUFFICIENCY INFORMATION — S13
END

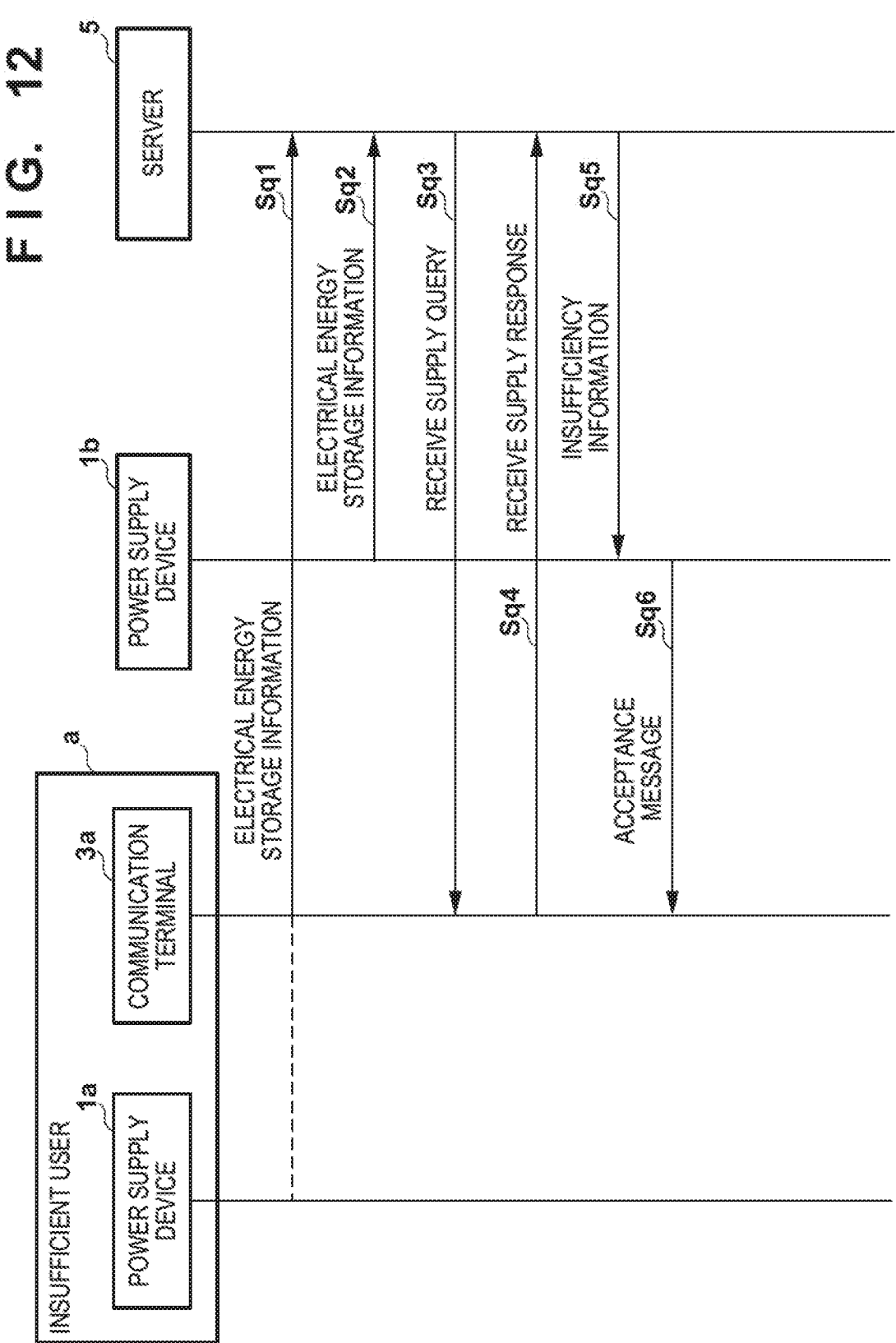
F I G.  12

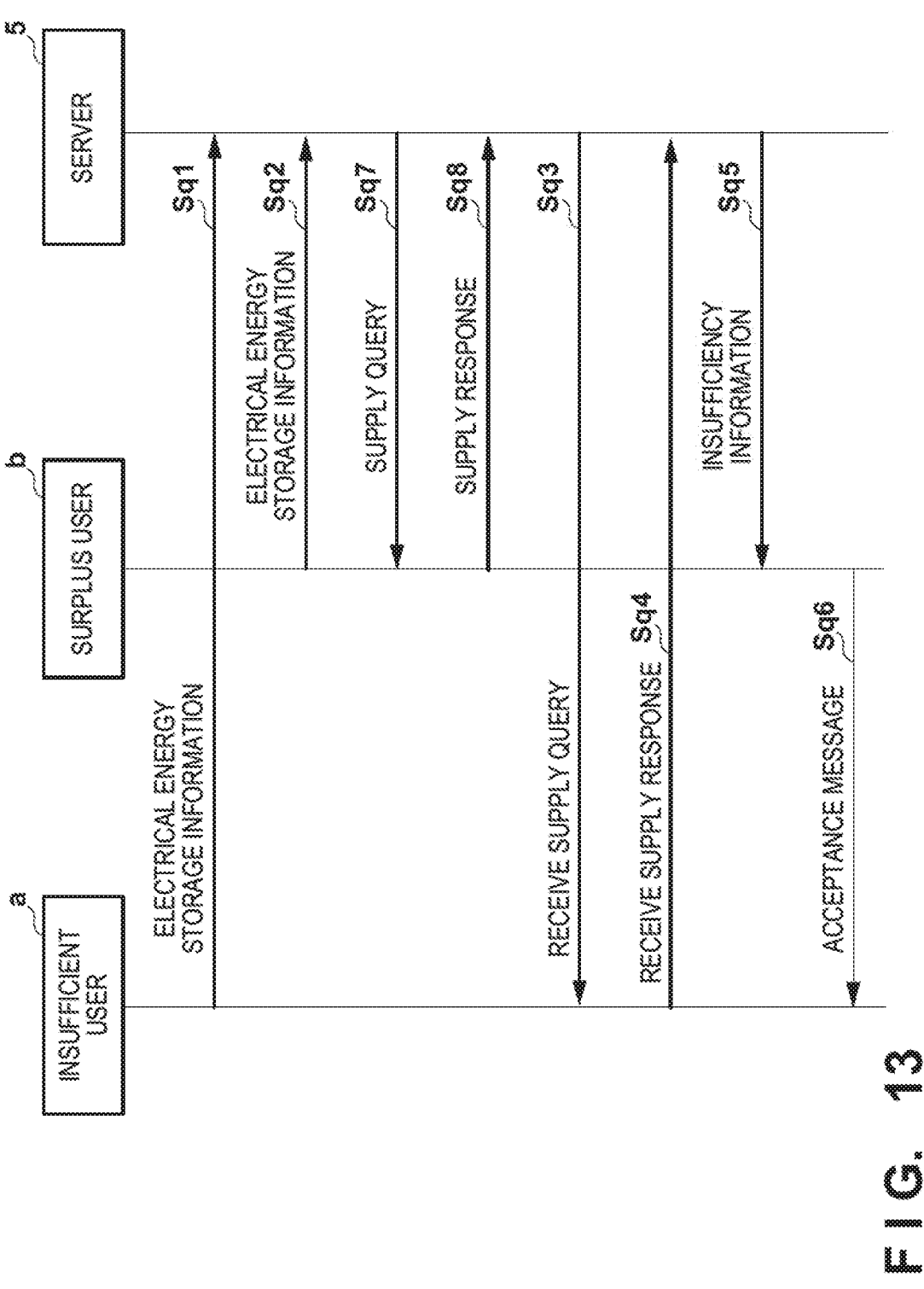
F I G. 13

SYSTEM FOR PROMOTING LENDING OR BORROWING OF PORTABLE ELECTRIC POWER SUPPLY

CROSS-REFERENCE TO RELATED APPLICATION(S)

This application is a continuation of International Patent Application No. PCT/JP2018/044961 filed on Dec. 6, 2018, which claims priority to and the benefit of Japanese Patent Application No. 2018-052598 filed on Mar. 20, 2018, the entire disclosures of which are incorporated herein by reference.

BACKGROUND OF THE INVENTION

Field of the Invention

The present invention relates to a portable electrical energy storage device, a server device, and a system for promoting the lending and borrowing of portable electrical energy storage devices.

Description of the Related Art

PTL 1 describes a system of guiding an electric vehicle installed with an electric vehicle battery to a charging facility with a low power price. The number of electric vehicles and charging facilities are expected to increase in the coming years.

CITATION LIST

Patent Literature

PTL 1: Japanese Patent Laid-Open No. 2011-128871

Electric vehicles can be used to supply power from the electric vehicle battery to an external home appliance. Also, portable storage batteries are becoming more common. In recent years, in the U.S. for example, the number of camp lovers who take portable power generators and portable storage batteries to camping grounds to use home appliances is increasing. However, when the fuel for the engine runs out or the charge amount runs low, the camp lovers cannot use the home appliances. At camping grounds, many camp lovers gather. Thus, if the portable storage battery of one camp lover is unable to supply power, the portable storage battery of another camp lover may be able to supply power. Also, the use of portable storage batteries as a power source for stalls is expected to become more common. When the charge of a portable storage battery for a stall runs low, the stall operator may wish for other users to charge the battery using their portable storage battery. In this way, as portable storage batteries become more common, the demand for the lending and borrowing of portable storage batteries between users will also increase. A user that supplies power to another user using the remaining power in their own portable storage battery may wish for remuneration. Also, the other user may be willing to pay a price for receiving the supply of power.

SUMMARY OF THE INVENTION

According to the present invention, for example, a system is provided which includes a server device; and a plurality of portable electrical energy storage devices, wherein the server device includes: an acquisition unit configured to acquire status information indicating an amount of stored electrical energy of each one of the plurality of portable electrical energy storage devices and position information indicating a geographic position of each one of the plurality of portable electrical energy storage devices; a user database configured to associate the status information and the position information acquired by the acquisition unit with a communication address of a user and storing the status information and the position information; a first extraction unit configured to extract, from the user database, position information or a communication address of a portable electrical energy storage device with an insufficient amount of stored electrical energy on the basis of the status information; a second extraction unit configured to extract, from the user database, a communication address of a user of a portable electrical energy storage device not having an insufficient amount of stored electrical energy on the basis of the status information; and a transmission unit configured to transmit insufficiency information including position information or a communication address extracted by the first extraction unit to a communication address extracted by the second extraction unit; and each one of the plurality of portable electrical energy storage devices includes: a communication unit configured to communicate with the server device; an electrical energy storing unit; a measuring unit configured to measure an amount of stored electrical energy of the electrical energy storing unit; and a positioning unit configured to find a geographic position, wherein the communication unit is further configured to transmit, to the server device, status information indicating an amount of stored electrical energy measured by the measuring unit and position information indicating a position found by the positioning unit.

Further features of the present invention will become apparent from the following description of exemplary embodiments (with reference to the attached drawings).

BRIEF DESCRIPTION OF THE DRAWINGS

FIG. 4 is a diagram illustrating a control circuit of a portable electrical energy storage device.

FIG. 6 is a diagram illustrating a user database.

FIG. 9 is a flowchart illustrating a method for lending power.

FIG. 10 is a flowchart illustrating a method for lending power.

FIG. 12 is a sequence diagram illustrating a method for lending power.

FIG. 13 is a sequence diagram illustrating a method for lending power.

DESCRIPTION OF THE EMBODIMENTS

Electrical Energy Storage Device Lending System

Figure 1:
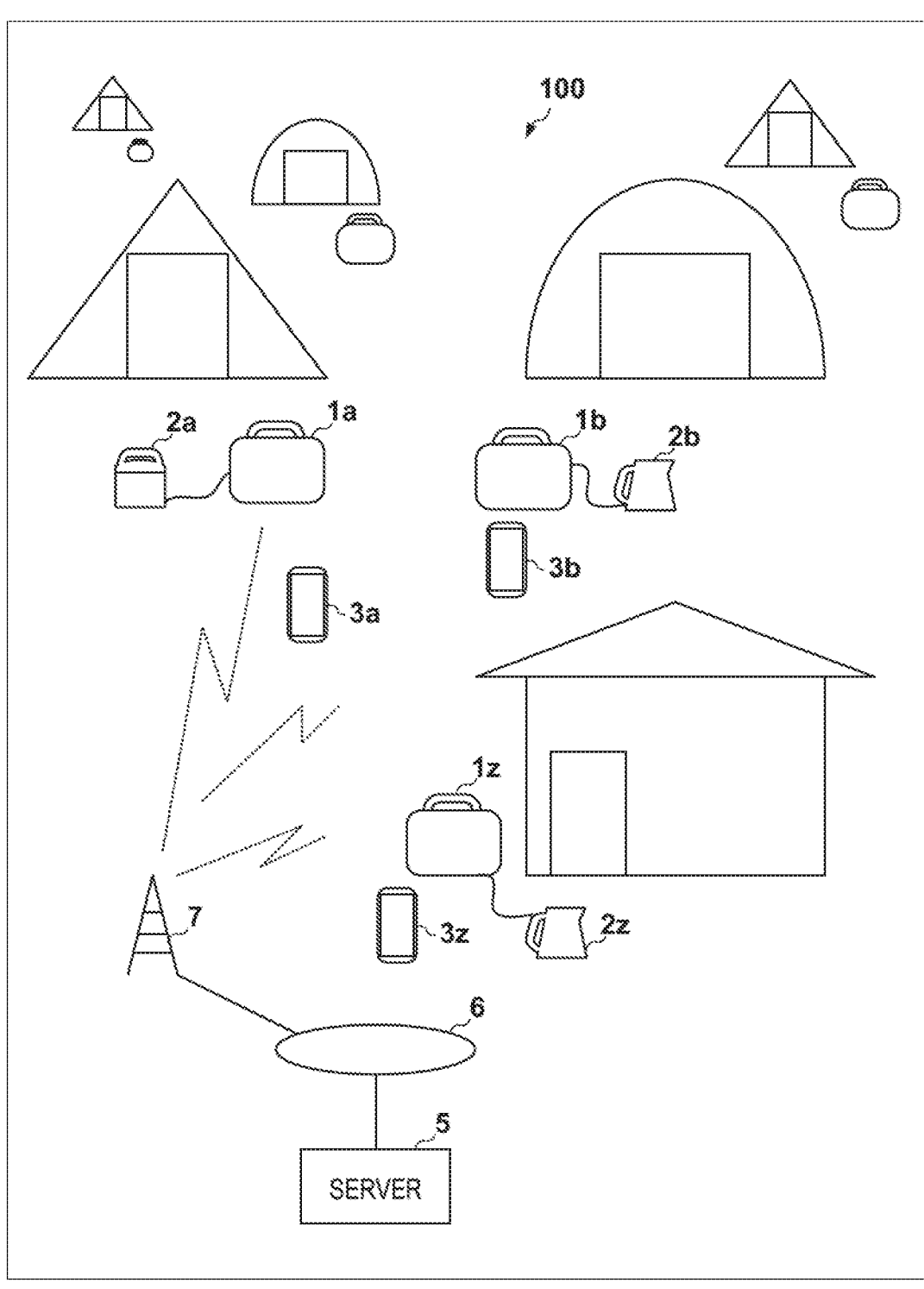
FIG. 1 is a diagram illustrating an electrical energy storage device lending system.

FIG. 1 illustrates an electrical energy storage device lending system 100. The lowercase letters on the end of the reference signs are attached to help distinguish between identical or similar devices. The letters may be omitted when describing a common point for a plurality of devices. At a camping ground, a plurality of camp lovers (users) set up tents and stay in bungalows and the like. A first user "a" has a portable electrical energy storage device 1a with an engine-driven power generator and a communication terminal 3a. The portable electrical energy storage device 1a supplies generated or stored power to a load 2a. A second user "b" has a portable electrical energy storage device 1b without a power generator and a communication terminal 3b. The portable electrical energy storage device 1b is charged by being supplied with power from a commercial AC power source. The portable electrical energy storage device 1b supplies power to a load 2b. A third user "z" has a portable electrical energy storage device 1z with an engine-driven power generator and a communication terminal 3z. The portable electrical energy storage device 1z supplies power to a load 2z. In the U.S. for example, many camping grounds have a site area of more than 100,000 square kilometers, and the distance between users can be a number of kilometers. In such a camping ground, commercial AC power sources are not found, and the users usually bring their own power source to the tent site. In this case, some users may have a surplus amount of stored electrical energy, while others may have an insufficient amount of stored electrical energy. Thus, it would be convenient for users to lend and borrow the portable electrical energy storage devices 1.

A server 5 is a computer provided inside or outside the camping ground. The server 5 may communicate with the portable electrical energy storage devices 1a, 1b, 1z, the communication terminals 3a, 3b, 3z, and the like via a network 6 or a wireless base station 7. The portable electrical energy storage devices 1a, 1b, 1z may communicate with the server 5 via the corresponding communication terminal 3a, 3b, 3z. Also, in the case in which the communication terminals 3a, 3b, 3z can communicate with the server 5, the portable electrical energy storage devices 1a, 1b, 1z may be unable to communicate with the server 5. The wireless base station 7 may be a cellular communication base station or may be a wireless LAN access point. The server 5 mediates the lending and borrowing of the portable electrical energy storage device 1 between users, introduces users with an abundant amount of stored electrical energy to users with an insufficient amount of stored electrical energy, introduces users with an insufficient amount of stored electrical energy to users with an abundant amount of stored electrical energy, and the like.

Portable Electrical Energy Storage Device

Figure 2:
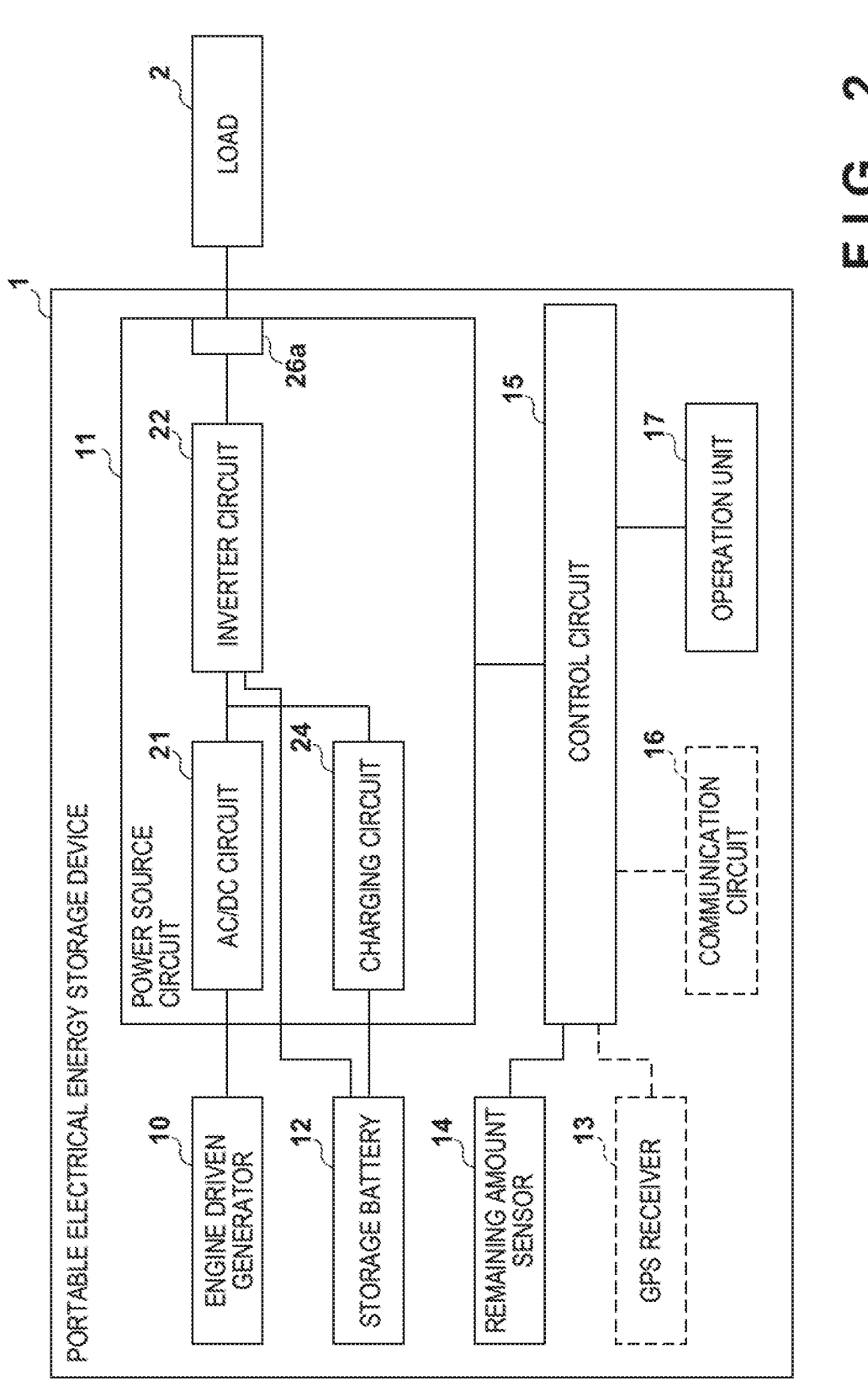
FIG. 2 is a diagram illustrating a portable electrical energy storage device.

FIG. 2 is a block diagram illustrating the portable electrical energy storage device 1. An engine-driven power generator 10 includes an engine operating via fuel supplied from a fuel tank and a power generator that is driven by the engine and generates power. The fuel may be gasoline, liquefied petroleum gas, or hydrogen for example. A power source circuit 11 is a circuit that converts a voltage generated by the engine-driven power generator 10 to predetermined alternating current or direct current. An AC/DC circuit 21 includes a rectification and smoothing circuit and the like for generating a direct current by rectifying and smoothing an alternating current generated by the engine-driven power generator 10. An inverter circuit 22 is a circuit for converting a direct current output from the AC/DC circuit 21 or a storage battery 12 to an alternating current with a stable predetermined frequency. The inverter circuit 22 may convert a direct current output from the storage battery 12 to an alternating current with a stable predetermined frequency. An AC terminal 26a is an AC outlet terminal to which the load 2 is connected. A charging circuit 24 charges the storage battery 12 using power output from the AC/DC circuit 21. A control circuit 15 is a circuit that controls the power source circuit 11, a GPS receiver 13, a communication circuit 16, and an operation unit 17. The GPS receiver 13 finds a position by receiving signals from GPS satellites and outputs the position result (for example, latitude and longitude) to the control circuit 15. The communication circuit 16 communicates with a smartphone, personal computer (PC), and the like and communicates with the server 5 via wired or wireless communication. The operation unit 17 includes a display device and an input device. A remaining amount sensor 14 measures the amount of stored electrical energy (for example, voltage) of the storage battery 12 and outputs the measurement result to the control circuit 15. The voltage of the storage battery 12 decreases as the amount of stored electrical energy of the storage battery 12 decreases. Thus, the voltage of the storage battery 12 is an indicator of the amount of stored electrical energy of the storage battery 12. The control circuit 15 transmits to the server 5 electrical energy storage information indicating the amount of stored electrical energy of the storage battery 12 in accordance with a periodic request signal or a request signal from the server 5. In this way, the server 5 is able to collect the electrical energy storage status of various users.

Figure 3:
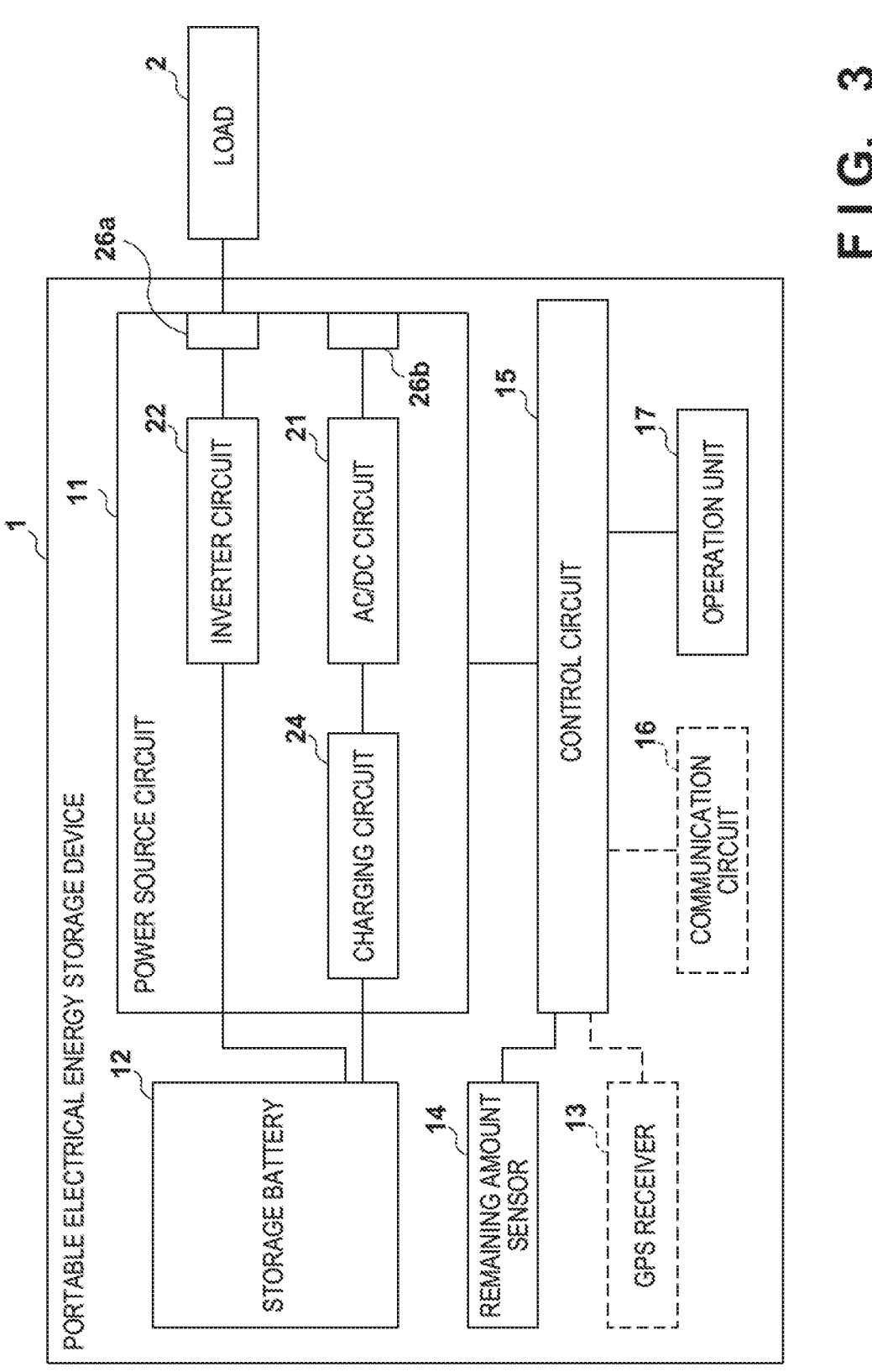
FIG. 3 is a diagram illustrating a portable electrical energy storage device.

FIG. 3 is a block diagram illustrating the portable electrical energy storage device 1 without the engine-driven power generator 10. The portable electrical energy storage device 1 of FIG. 2 and the portable electrical energy storage device 1 of FIG. 3 have the same configuration except for units relating to the engine-driven power generator 10. The AC/DC circuit 21 converts an alternating current input from an AC terminal 26b to a direct current and supplies this to the charging circuit 24. The AC terminal 26b is an AC inlet terminal. The charging circuit 24 charges the storage battery 12 using the power supplied from the AC/DC circuit 21. Users presumably charge the portable electrical energy storage device 1 at home, for example, before bringing it to the camping ground.

Control Circuit of Portable Electrical Energy Storage Device 1

FIG. 4 illustrates the control circuit 15 of the portable electrical energy storage device 1. The control circuit 15 includes a CPU 31 and a storage device 32. The CPU 31 includes a plurality of functions realized by a control program stored in the storage device 32 being executed. Note that at least one of or all of the functions may be realized by a hardware circuit (e.g. one or more processors), such as a digital signal processor (DSP), field programmable gate array (FPGA), and the like. The storage device 32 includes a memory, such as a RAM, ROM, and the like.

An amount of stored electrical energy acquisition unit 33 stores the measurement results of the remaining amount sensor 14 in the storage device 32 as status information 37. The status information 37 is information indicating the amount of stored electrical energy of the storage battery 12. A positioning control unit 34 controls the GPS receiver 13, acquires position information 39 of the portable electrical energy storage device 1, and stores the position information 39 in the storage device 32. The position information 39 is information indicating the geographic position (for example, latitude and longitude) of the portable electrical energy storage device 1. The storage device 32 may also store authentication information 38 and a communication address 40. The authentication information 38 may include user identification information, a password, unique identifying information allocated to the portable electrical energy storage device 1, and the like. The communication address 40 is a communication address for another user or the server 5 to transmit a message to the user. The communication address 40, for example, is an email address, an SNS service address, an address for communicating with an application executed by the communication terminal 3 or the portable electrical energy storage device 1, and the like. A server communication unit 35 communicates with the server 5 when a predetermined start communication condition is satisfied. For example, the server communication unit 35 periodically generates electrical energy storage information including the status information 37, the position information 39, unique identifying information, and the like and transmits this information to the server 5. The server communication unit 35, for example, receives a query message or an acceptance message transmitted by the server 5 and transmits a response to the server 5. The server communication unit 35, for example, receives an acceptance message or an offer message transmitted by another user and transmits an offer response. A UI unit 36, for example, displays the query message transmitted by the server 5 on a display device of the operation unit 17, generates a response to the query according to an instruction input from the operation unit 17, and transmits this response to the server 5. The UI unit 36, for example, displays an acceptance message or an offer message on the display device, generates a response according to an instruction input from the operation unit 17, and transmits this to the server 5 or another user. Examples of these messages and responses are described in detail below.

Server 5

Figure 5:
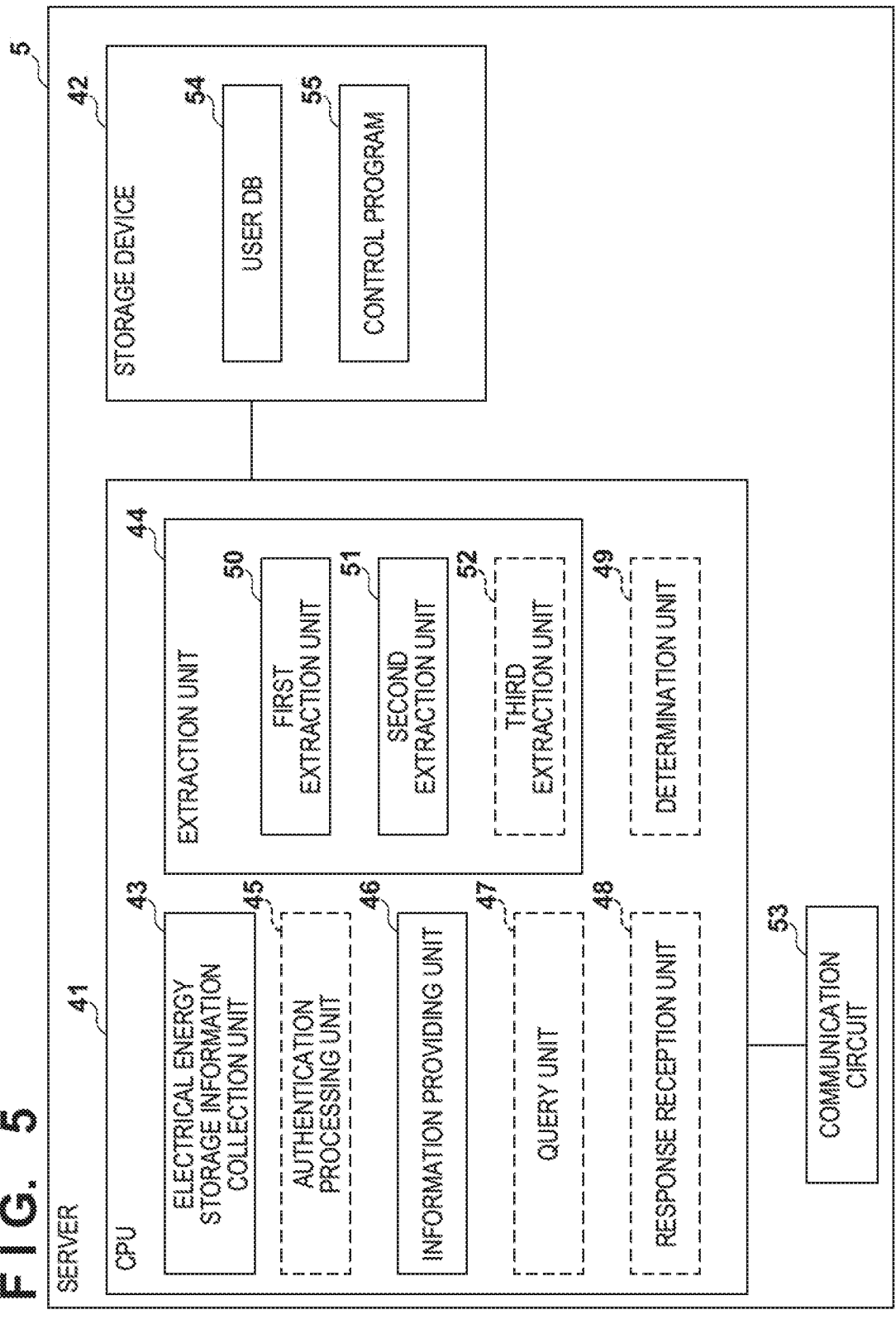
FIG. 5 is a diagram illustrating a server device.

FIG. 5 is a block diagram illustrating the functions of the server 5. A CPU 41 includes a plurality of functions realized by a control program 55 stored in a storage device 42 being executed. Note that at least one of or all of the functions may be realized by a hardware circuit, such as a DSP, FPGA, and the like. The storage device 42 includes a RAM, ROM, hard disk drive (HDD), silicon state disk (SSD), or the like. A communication circuit 53 is a communication circuit for communicating with the portable electrical energy storage device 1 and the communication terminal 3 via a network.

An electrical energy storage information collection unit 43 receives, via the communication circuit 53, electrical energy storage information transmitted from a plurality of the portable electrical energy storage devices 1 and registers this information in a user DB 54. The user DB is an abbreviation of user database.

FIG. 6 illustrates a storage structure of the user DB 54. User ID is the identification information of a user. Password is a part of authentication information. Storage battery ID is unique identifying information allocated to the portable electrical energy storage device 1. Specification information indicates the nominal amount of charge (amount of stored electrical energy) able to be supplied to the storage battery 12 of the portable electrical energy storage device 1. Electrical energy storage status indicates the electrical energy storage status of the portable electrical energy storage device 1. The electrical energy storage status may indicate quantitative information (for example, the charge amount, the ratio of the charge amount to the full charge, and the like) or qualitative information (for example, full charge state, low state, and the like). Communication address is an email address, an SNS service address, or an address for communicating with an application executed by the communication terminal 3 or the portable electrical energy storage device 1. Position information is position information indicating the geographic position of the portable electrical energy storage device 1.

Returning to FIG. 5, an extraction unit 44, for example, extracts a user (the portable electrical energy storage device 1) with an insufficient amount of stored electrical energy by searching the user DB 54 and extracts a user (the portable electrical energy storage device 1) with an abundant amount of stored electrical energy. For example, a first extraction unit 50 extracts, from the user DB 54, the position information or the communication address of the portable electrical energy storage device 1 with an insufficient amount of stored electrical energy on the basis of the electrical energy storage status. A second extraction unit 51 extracts, from the user DB 54, the communication address of the user of the portable electrical energy storage device 1 not having an insufficient amount of stored electrical energy on the basis of the electrical energy storage status. The second extraction unit 51 may preferentially extract the position information or the communication address of the portable electrical energy storage device 1 not having an insufficient amount of stored electrical energy located close to the position of the portable electrical energy storage device 1 with an insufficient amount of stored electrical energy on the basis of the position information extracted by the first extraction unit 50 and the position information of the portable electrical energy storage device 1 not having an insufficient amount of stored electrical energy. The second extraction unit 51 may preferentially extract the position information or the communication address of the portable electrical energy storage device 1 with a high amount of stored electrical energy on the basis of the electrical energy storage status of the portable electrical energy storage device 1 not having an insufficient amount of stored electrical energy. A third extraction unit 52 extracts the communication address of the portable electrical energy storage device 1 with an insufficient amount of stored electrical energy on the basis of the electrical energy storage status. The second extraction unit 51 may extract the portable electrical energy storage device 1 with little change in the amount of stored electrical energy over a predetermined amount of time on the basis of the electrical energy storage status of the portable electrical energy storage device 1 not having an insufficient amount of stored electrical energy. This is because the amount of stored electrical energy in such a portable electrical energy storage device 1 can be considered as a surplus amount of stored electrical energy not having a use. The predetermined amount of time may range from 1 hour to 6 hours, for example.

An authentication processing unit 45 determines whether or not a user or a portable electrical energy storage device 1 is the user or the portable electrical energy storage device 1 registered in the user DB 54. An information providing unit 46 generates and transmits information for introducing a user with an abundant amount of stored electrical energy to a user with an insufficient amount of stored electrical energy and information for introducing a user with an insufficient amount of stored electrical energy to a user with an abundant amount of stored electrical energy. This information may be referred to as insufficiency information. Insufficiency information includes, for example, information relating to the communication address of the user and position information. A user with an abundant amount of stored electrical energy may contact a user nearby with an insufficient amount of stored electrical energy and offer to lend the portable electrical energy storage device 1. A user with an insufficient amount of stored electrical energy may contact a user nearby with an abundant amount of stored electrical energy and ask to borrow the portable electrical energy storage device 1. The communication address is a phone number, an email address, an SNS service address, an address for a lending mediating application, and the like of the user. A lending mediating application is a program for communicating with the server 5 that runs on the portable electrical energy storage device 1 or the communication terminal 3.

A query unit 47 transmits a query message to a communication address of the portable electrical energy storage device 1 with an insufficient amount of stored electrical energy extracted by the third extraction unit 52 for inquiring as to whether or not a supply of power received from another user is desired. The query unit 47 is configured in this manner because in some cases, the user of the portable electrical energy storage device 1 with an insufficient amount of stored electrical energy may not wish to borrow the portable electrical energy storage device 1 from another user. A response reception unit 48 receives a response to the query message. A determination unit 49 determines whether or not the user of the portable electrical energy storage device 1 with an insufficient amount of stored electrical energy desires to receive a supply of power from another user on the basis of the response. When the determination unit 49 determines that the user of the portable electrical energy storage device 1 with an insufficient amount of stored electrical energy desires to receive a supply of power from another user, the information providing unit 46 transmits the insufficiency information including the position information and the communication address extracted by the first extraction unit 50 to the communication address extracted by the second extraction unit 51. The insufficiency information may be referred to as lending offer information or desire to borrow information.

The query unit 47 may transmit a query message to a communication address of the user of the portable electrical energy storage device 1 not having an insufficient amount of stored electrical energy extracted by the second extraction unit 51 for inquiring as to whether or not they desire to supply power to another user. The query unit 47 is configured in this manner because in some cases, the user of the portable electrical energy storage device 1 with an abundant amount of stored electrical energy may not wish to lend the portable electrical energy storage device 1 to another user. The response reception unit 48 receives a response to the query message. The determination unit 49 determines whether or not the user of the portable electrical energy storage device 1 not having an insufficient amount of stored electrical energy desires to supply power to another user on the basis of the response. The first extraction unit 50 extracts, from the user database, the position information or the communication address of the portable electrical energy storage device 1 with an insufficient amount of stored electrical energy in the case in which the user with the portable electrical energy storage device 1 not having an insufficient amount of stored electrical energy desires to supply power to another user. In a similar manner, the information providing unit 46 may transmit insufficiency information including the position information and the communication address extracted by the first extraction unit 50 to the communication address of the user of the portable electrical energy storage device 1 not having an insufficient amount of stored electrical energy wishing to supply power to another user.

Lending Sequence I

Figure 7:
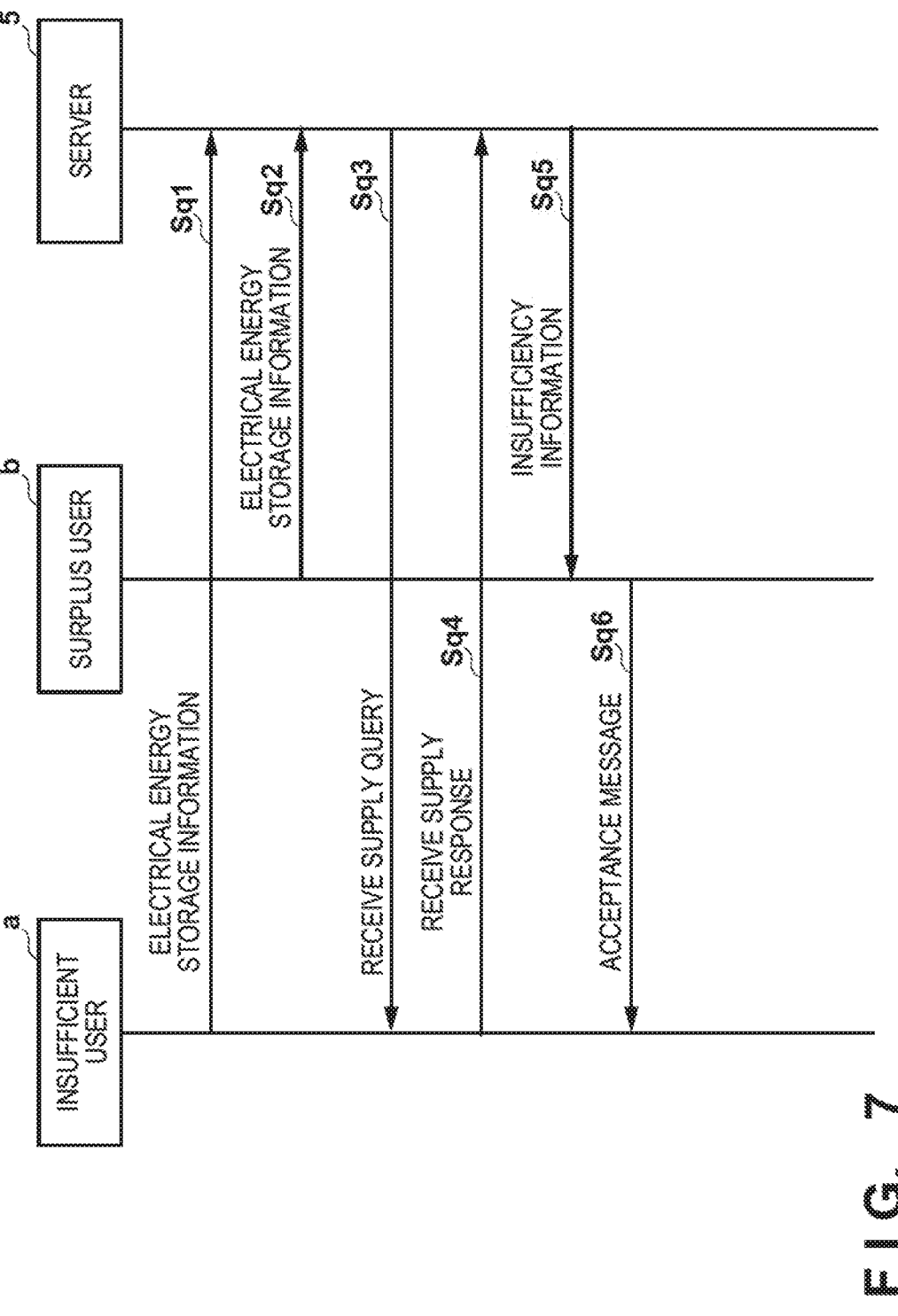
FIG. 7 is a sequence diagram illustrating a method for lending power.

FIG. 7 is a sequence diagram illustrating a method for lending a portable electrical energy storage device. Here, the first user "a" is an insufficient user, and the second user "b" is a surplus user. In other words, the storage battery 12 of the portable electrical energy storage device 1*a* has a low amount of stored electrical energy, and the storage battery 12 of the portable electrical energy storage device 1*b* has a high amount of stored electrical energy. Note that hereinafter, the portable electrical energy storage device 1*a* may be the communication terminal 3*a*. Also, the portable electrical energy storage device 1*b* may be the communication terminal 3*b*.

In Sq1, the portable electrical energy storage device 1*a* of the first user "a" transmits electrical energy storage information to the server 5. When the server 5 receives the electrical energy storage information, the server 5 updates the contents of the user DB 54 according to the received electrical energy storage information.

In Sq2, the portable electrical energy storage device 1*b* of the second user "b" transmits electrical energy storage information to the server 5. When the server 5 receives the electrical energy storage information, the server 5 updates the contents of the user DB 54 according to the received electrical energy storage information.

In Sq3, the server 5, by searching the user DB 54, extracts the portable electrical energy storage device 1*a* with a low amount of stored electrical energy in the storage battery 12 and transmits a receive supply query to the portable electrical energy storage device 1*a*. The receive supply query is a message for querying the first user "a" as to whether or not they desire to borrow the portable electrical energy storage device 1 of another user. In the receive supply query, the position information and communication address of the portable electrical energy storage device 1*a* of the first user "a" may be included.

In Sq4, the portable electrical energy storage device 1*a* of the first user "a" transmits a receive supply response to the server 5. The portable electrical energy storage device 1*a* displays the receive supply query on the display device and generates a response in accordance with an instruction of the first user an input from the input device. In this response, a message indicating whether or not they wish to borrow is included. Note that Sq3 and Sq4 are optional.

In Sq5, the server 5 transmits insufficiency information to the portable electrical energy storage device 1*b* of the second user "b". In the insufficiency information, the position information and communication address of the portable electrical energy storage device 1*a* of the first user "a", for example, may be included. The portable electrical energy storage device 1*b* displays the position information and communication address of the portable electrical energy storage device 1*a* of the first user "a" on the display device.

In Sq6, the portable electrical energy storage device 1*b* transmits an acceptance message to the communication address of the first user "a" or the portable electrical energy storage device 1*a*. In the acceptance message, the compensation amount, the lending location, the desired lending date and time, the desired return date and time, the return location, and other lending condition information relating to lending the portable electrical energy storage device 1*b* may be included. Note that negotiations involving the lending condition information (borrowing condition information) may be left up to the users.

Lending Sequence II

Figure 8:
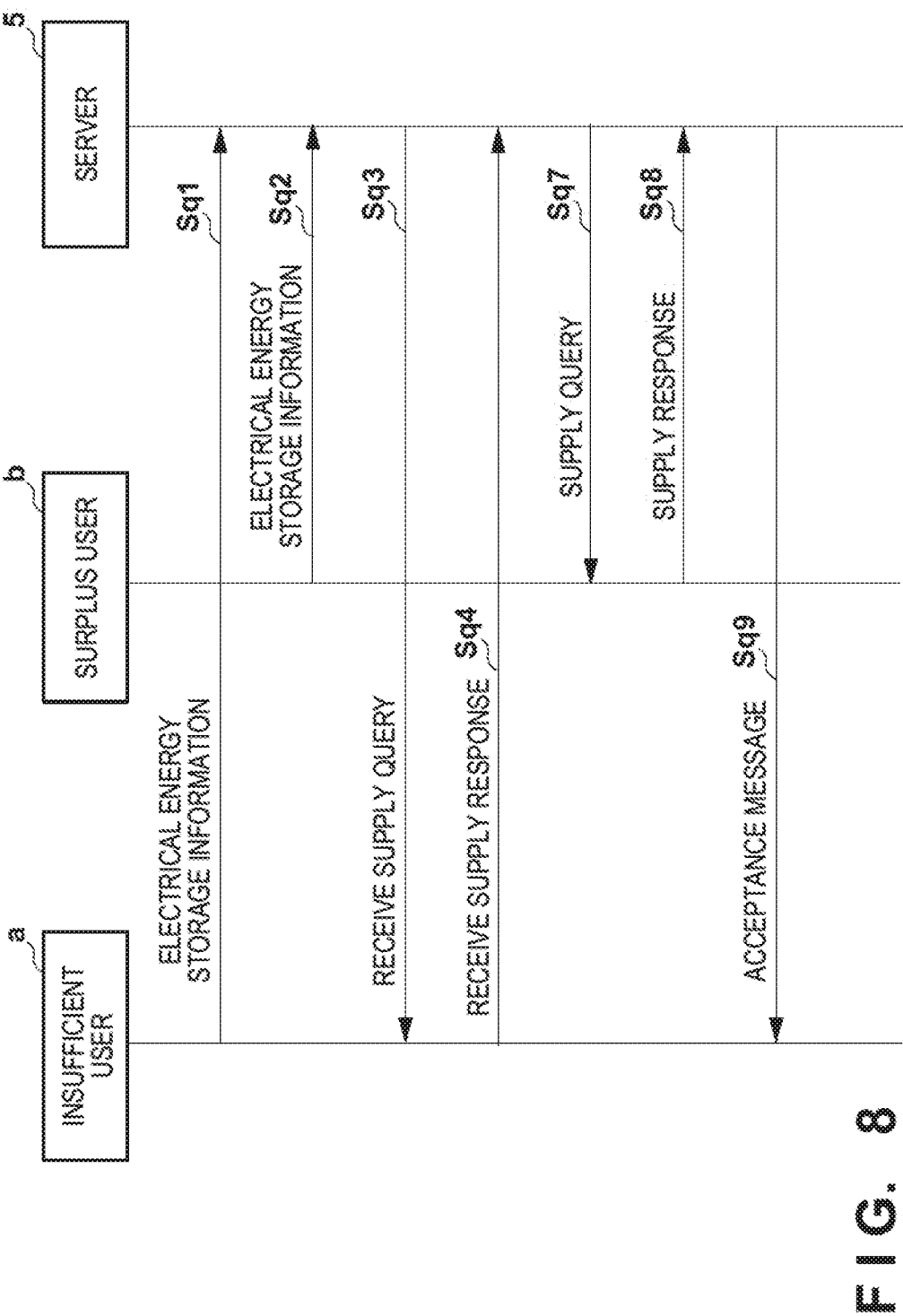
FIG. 8 is a sequence diagram illustrating a method for lending power.

FIG. 8 is a sequence diagram illustrating a method for lending a portable electrical energy storage device. In FIG. 8, Sq5 and Sq6 of FIG. 7 are replaced with Sq7 to Sq9.

In Sq7, the server 5, by searching the user DB 54, extracts the portable electrical energy storage device 1*b* with a high amount of stored electrical energy in the storage battery 12 and transmits a supply query to the portable electrical energy storage device 1*b*. The supply query is a message for querying the second user "b" as to whether or not they desire to lend the portable electrical energy storage device 1 to another user. In the supply query, the position information and communication address of the portable electrical energy storage device 1*b* of the first user "A" may be included.

In Sq8, the portable electrical energy storage device 1*b* of the second user "b" transmits a supply response to the server 5. The portable electrical energy storage device 1*b* displays the supply query on the display device and generates a response in accordance with an instruction of the second user "b" input from the input device. In this response, a message indicating whether or not they wish to lend is included. Note that in the response, information of the lending location, the desired lending date and time, the compensation amount, the desired return date and time, and the return location may be included.

In Sq9, the server 5 transmits an acceptance message to the portable electrical energy storage device 1*a* of the first user "a". Note that in the acceptance message, information of the communication address, the lending location, the compensation amount, the desired return date and time, and the return location of the second user "b" may be included. The first user "a" may contact the second user "b" using the communication address of the second user "b" and negotiate the compensation amount, the lending location, the desired lending date and time, the desired return date and time, the return location, and the like.

Flowchart

FIG. 9 is a flowchart illustrating a method for lending executed by the CPU 41 of the server 5. The execution order of step S2 and step S3 may be reversed.

In step S1, the CPU 41 (the electrical energy storage information collection unit 43) collects the electrical energy storage information from a plurality of portable electrical energy storage devices 1 and updates the user DB 54.

In step S2, the CPU 41 (the first extraction unit 50) searches the user DB 54 and extracts an insufficient user (a user low in power). For example, the first extraction unit 50 extracts a user (the portable electrical energy storage device 1) with less than a first threshold for the amount of stored electrical energy indicated by the electrical energy storage status.

In step S3, the CPU 41 (the second extraction unit 51) searches the user DB 54 and extracts a surplus user (a user high in power). For example, the second extraction unit 51 extracts a user (the portable electrical energy storage device 1) with greater than or equal to a second threshold for the amount of stored electrical energy indicated by the electrical energy storage status. The second threshold is higher than the first threshold.

In step S4, the CPU 41 (the information providing unit 46) provides the information of the insufficient user to the surplus user. The information providing unit 46 transmits the insufficiency information including the position information and the communication address of the insufficient user to the communication address of the surplus user. The communication address may be the communication address of the portable electrical energy storage device 1 or may be the communication address of the communication terminal 3.

FIG. 10 is a flowchart illustrating a method for lending executed by the CPU 31 of the portable electrical energy storage device 1.

In step S11, the CPU 31 (the server communication unit 35) transmits the electrical energy storage information to the server 5. For example, the server communication unit 35 transmits, to the server 5, the electrical energy storage information including the status information 37 acquired by the amount of stored electrical energy acquisition unit 33, the position information acquired by the positioning control unit 34 and the GPS receiver 13, the communication address 40 of the portable electrical energy storage device 1 or the user, and the like.

In step S12, the CPU 31 (the server communication unit 35) receives the insufficiency information.

In step S13, the CPU 31 (UI unit 36) outputs the insufficiency information on the display device of the operation unit 17.

Communication Terminal

In the embodiment described above, the portable electrical energy storage device 1 is assumed to be capable of communicating with the server 5. However, this assumption is not essential. The communication terminal 3 may be implemented with the functions of the CPU 31 of the portable electrical energy storage device 1.

Figure 11:
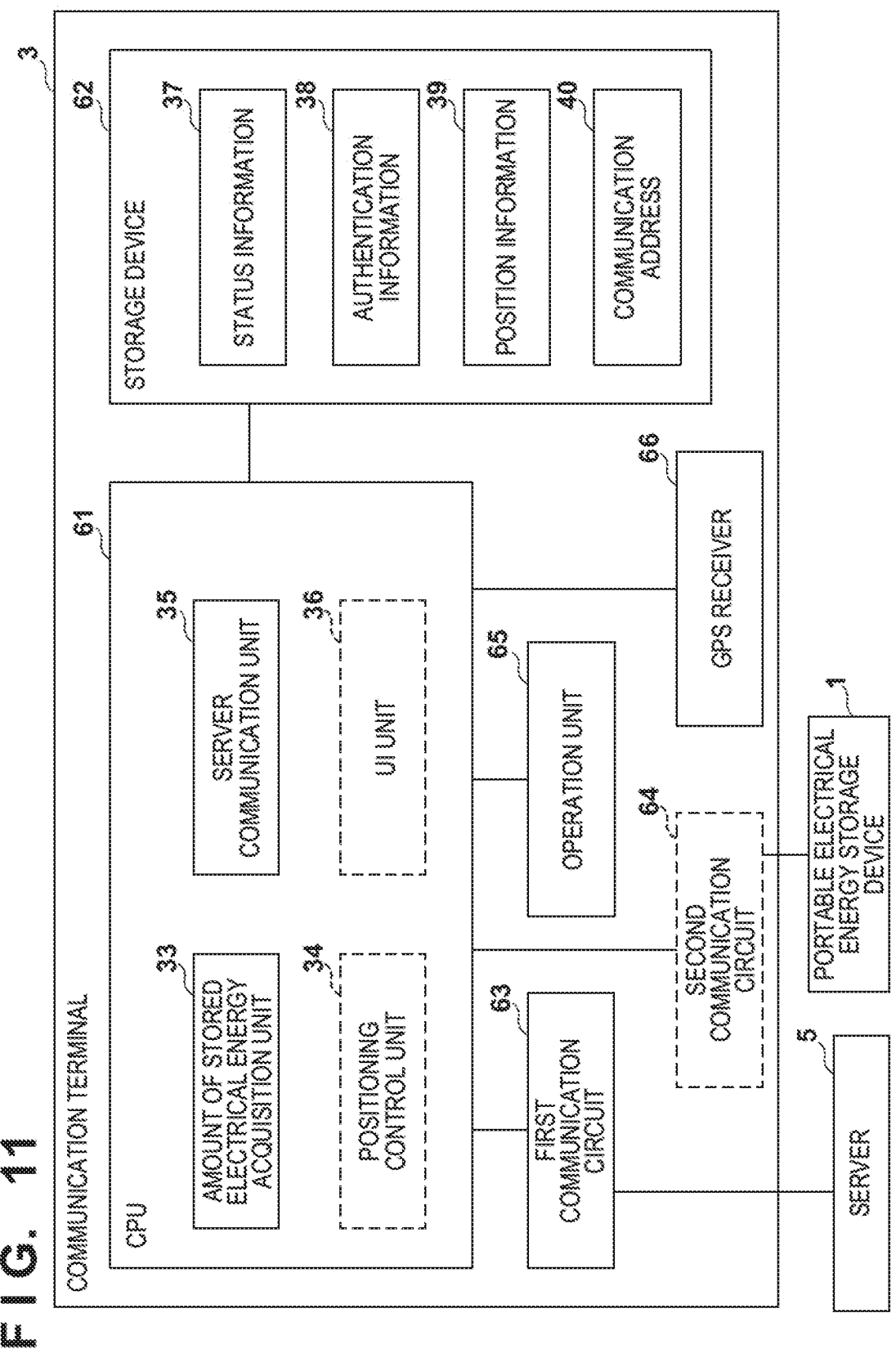
FIG. 11 is a diagram illustrating a communication terminal.

FIG. 11 is a block diagram illustrating the functions of the communication terminal 3. A CPU 61 includes a plurality of functions realized by a control program stored in a storage device 62 being executed. Note that at least one of or all of the functions may be realized by a hardware circuit, such as a DSP, FPGA, and the like. The storage device 62 includes a RAM, ROM, hard disk drive (HDD), silicon state disk (SSD), or the like. A first communication circuit 63 is a communication circuit for communicating with the server 5 with a network. A second communication circuit 64 is an optional unit and a communication circuit for communicating with the portable electrical energy storage device 1. An operation unit 65 includes a display device and an input device. A GPS receiver 66 finds the position of the communication terminal. Units common to both FIG. 11 and FIG. 4 are given the same reference sign and the description thereof is incorporated herein.

The amount of stored electrical energy acquisition unit 33 acquires the status information 37, for example, input by the user via the operation unit 65. Alternatively, the amount of stored electrical energy acquisition unit 33 acquires the status information 37, for example, from the portable electrical energy storage device 1 by communicating with the portable electrical energy storage device 1 via the second communication circuit 64. The positioning control unit 34 controls the GPS receiver 66, finds the position of the communication terminal 3, and acquires the position information 39. Alternatively, the positioning control unit 34 acquires the position information 39 from the portable electrical energy storage device 1 by communicating with the portable electrical energy storage device 1 via the second communication circuit 64.

FIG. 12 is a sequence diagram illustrating a method for lending. Note that hereinafter, the portable electrical energy storage device 1*b* may be interchanged with the communication terminal 3*b*. In other words, the sever 5 may execute communication with the portable electrical energy storage device 1*b* instead with the communication terminal 3*b*. Also, the communication terminal 3*b* may include the functions illustrated in FIG. 11.

In Sq1, the communication terminal 3*a* of the first user "a" transmits electrical energy storage information to the server 5. When the server 5 receives the electrical energy storage information, the server 5 updates the contents of the user DB 54 according to the received electrical energy storage information.

In Sq2, the portable electrical energy storage device 1*b* (the communication terminal 3*b*) of the second user "b" transmits electrical energy storage information to the server 5. When the server 5 receives the electrical energy storage information, the server 5 updates the contents of the user DB 54 according to the received electrical energy storage information.

In Sq3, the server 5, by searching the user DB 54, extracts the portable electrical energy storage device 1*a* with a low amount of stored electrical energy in the storage battery 12 and transmits a receive supply query to the communication terminal 3*a*.

In Sq4, the communication terminal 3*a* transmits a receive supply response to the server 5. The communication terminal 3*a* displays the receive supply query on the display device and generates a response in accordance with an instruction of the first user "a" input from the input device. In this response, a message indicating whether or not they wish to borrow is included. Note that Sq3 and Sq4 are optional.

In Sq5, the server 5 transmits insufficiency information to the portable electrical energy storage device 1*b* (the communication terminal 3*b*) of the second user "b". The portable electrical energy storage device 1*b* or the communication terminal 3*b* displays the position information and communication address of the first user "a" on the display device.

In Sq6, the portable electrical energy storage device 1*b* (the communication terminal 3*b*) transmits an acceptance message to the communication address of the first user "a". The UI unit 36 of the communication terminal 3*a* receives the acceptance message and displays the acceptance message on the display device of the operation unit 65.

Other Sequences

FIG. 13 is a sequence diagram illustrating a method for lending a portable electrical energy storage device. Compared to FIG. 8, the order of sequences in FIG. 13 are changed. In FIG. 13, in Sq1 and Sq2, the server 5 collects the electrical energy storage information of a plurality of portable electrical energy storage devices 1 and extracts a user (portable electrical energy storage device 1) with a surplus amount of stored electrical energy from the user DB 54. In Sq7, the server 5 transmits a supply query to the extracted user (portable electrical energy storage device 1) with a surplus amount of stored electrical energy. In Sq8, the server 5 receives a supply response and selects a user who wishes to lend the portable electrical energy storage device 1 to another user. In the case in which more than one user wishes to lend the portable electrical energy storage device 1, the server 5 extracts a user (portable electrical energy storage device 1) with an insufficient amount of stored electrical energy from the user DB 54. In Sq3, the server 5 transmits a receive supply query to the user (portable electrical energy storage device 1) with an insufficient amount of stored electrical energy. In Sq4, the server 5 receives a receive supply response from the user (portable electrical energy storage device 1) with an insufficient amount of stored electrical energy. For example, the server 5 references the position information of the insufficient user "a" and the surplus users b and determines a combination of an insufficient user "a" and a surplus user "b" that are located close to one another. In Sq5, the server 5 transmits the insufficiency information to the surplus user "b". In Sq6, the surplus user "b" (portable electrical energy storage device 1*b* or communication terminal 3*b*) transmits an acceptance message to the insufficient user "a". In this way, the order of sequences can be changed.

Figure 14:
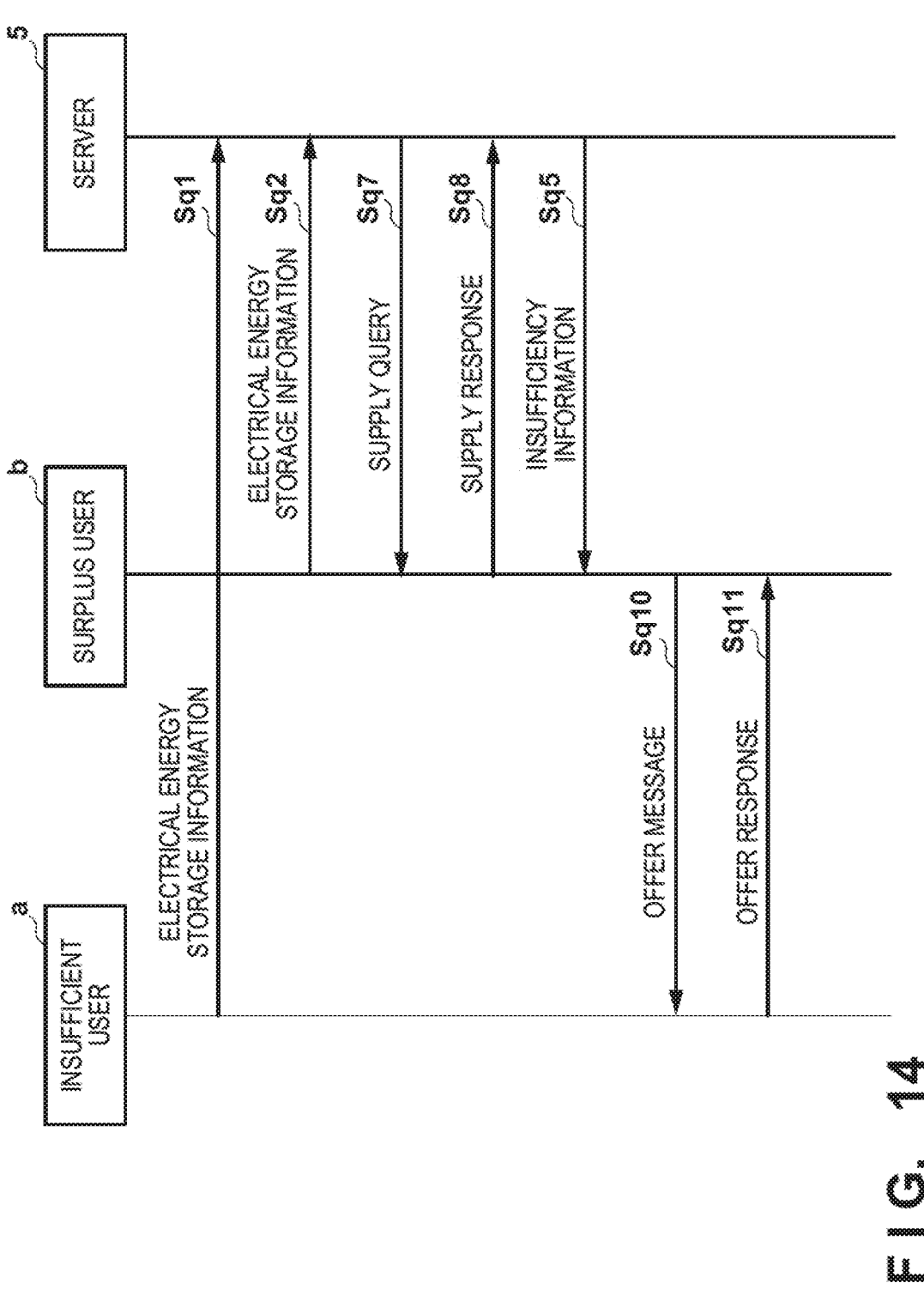
FIG. 14 is a sequence diagram illustrating a method for lending power.

FIG. 14 is a sequence diagram illustrating a method for lending a portable electrical energy storage device. In FIG. 14, Sq5 is executed after Sq1, Sq2, Sq7, and Sq8 of FIG. 13. In this way, the surplus user "b" obtains the communication address of the insufficient user "a". In Sq10, the portable electrical energy storage device 1*b* or the communication terminal 3*b* transmits an offer message to the insufficient user "a". In the offer message, the desired lending conditions of the surplus user "b", such as the compensation amount, the lending location, the return location, the lending date and time, the return date and time, and the like may be included. Here, a plurality of surplus users b may present conditions to a single insufficient user "a". In Sq11, the insufficient user "a" displays the lending conditions included in the offer message on the display device and transmits to the surplus user "b" an offer response indicating whether or not the offer is accepted. In this way, the server 5 may introduce the insufficient user "a" to the surplus user "b" and execute negotiations about lending between users.

Supplement

According to a first aspect, a server device is provided. The server 5 is an example of the server device. The electrical energy storage information collection unit 43 is an example of an acquisition unit configured to acquire status information indicating the electrical energy storage status of each of the plurality of portable electrical energy storage devices 1 and position information indicating the geographic position of each of the plurality of portable electrical energy storage devices 1. Generally, a portable electrical energy storage device may be grasped and lifted up by a hand of a human and/or have an assist handle grasped or gripped by a user.

The user DB 54 is an example of a user database configured to associate the status information and the position information acquired by the acquisition unit to the communication address of a user and storing them. The first extraction unit 50 is an example of a first extraction unit configured to extract, from the user database, the position information or the communication address of the portable electrical energy storage device 1 with an insufficient amount of stored electrical energy on the basis of the status information. The position information or the communication address of the communication terminal 3 owned by the same user of the portable electrical energy storage device 1 may be extracted. This is synonymous with the position information or the communication address of a user being acquired. The second extraction unit 51 is an example of a second extraction unit configured to extract, from the user database, the communication address of the user of the portable electrical energy storage device 1 not having an insufficient amount of stored electrical energy on the basis of the status information. The communication address of the portable electrical energy storage device 1 and/or the communication terminal 3 may also be extracted. The information providing unit 46, the query unit 47, the communication circuit 53 are examples of a transmission unit configured to transmit the insufficiency information including the position information or the communication address extracted by the first extraction unit to the communication address extracted by the second extraction unit. In this way, the surplus user "b" can learn of the insufficient user "a", and lending and borrowing of the portable electrical energy storage device 1 is promoted. Note that the transmission unit may transmit the insufficiency information (surplus information) including the position information and the communication address extracted by the second extraction unit to the communication address extracted by the first extraction unit.

According to a second aspect, the second extraction unit may preferentially extract the position information or the communication address of the portable electrical energy storage device not having an insufficient amount of stored electrical energy located close to the position of the portable electrical energy storage device with an insufficient amount of stored electrical energy on the basis of the position information extracted by the first extraction unit and the position information of the portable electrical energy storage device not having an insufficient amount of stored electrical energy. Having a user close by that wishes to borrow the portable electrical energy storage device gives motivation to users to lend the portable electrical energy storage device. Also, this gives hope to users wishing to borrow the portable electrical energy storage device that they can promptly borrow the portable electrical energy storage device.

According to a third aspect, the second extraction unit may preferentially extract the position information or the communication address of the portable electrical energy storage device with a high amount of stored electrical energy on the basis of the status information of the portable electrical energy storage device not having an insufficient amount of stored electrical energy. Considering typical cases, a user owning the portable electrical energy storage device with a high amount of stored electrical energy is able to lend the portable electrical energy storage device to another user.

According to a fourth aspect, the third extraction unit 52 is an example of a third extraction unit configured to extract, from the user database, the communication address of the portable electrical energy storage device with an insufficient amount of stored electrical energy on the basis of the status information. The query unit 47 is an example of a query unit configured to transmit a query message to a communication address of the portable electrical energy storage device with an insufficient amount of stored electrical energy extracted by the third extraction unit for inquiring as to whether or not a supply of power received from another user is desired. The response reception unit 48 is an example of a reception unit configured to receive a response to the quay message. The determination unit 49 is an example of a determining unit configured to determine whether or not the user of the portable electrical energy storage device with an insufficient amount of stored electrical energy desires to receive a supply of power from another user on the basis of the response. The information providing unit 46 is an example of a transmission unit configured to transmit, when the determining unit determines that the user of the portable electrical energy storage device with an insufficient amount of stored electrical energy desires to receive a supply of power from another user, the insufficiency information including the position information and the communication address extracted by the first extraction unit to the communication address extracted by the second extraction unit. By reflecting the wishes of the user in this manner, lending and borrowing of the portable electrical energy storage device 1 can be further promoted.

According to a fifth aspect, the query unit 47 is an example of a query unit configured to transmit a query message to a communication address of the user of the portable electrical energy storage device not having an insufficient amount of stored electrical energy extracted by the second extraction unit for inquiring as to whether or not they desire to supply power to another user. The response reception unit 48 is an example of a reception unit configured to receive a response to the query message. The determination unit 49 is an example of a determining unit configured to determine whether or not the user of the portable electrical energy storage device not having an insufficient amount of stored electrical energy desires to supply power to another user on the basis of the response. The first extraction unit 50 is an example of a first extraction unit configured to extract, from the user database, the position information or the communication address of the portable electrical energy storage device with an insufficient amount of stored electrical energy in the case in which the user of the portable electrical energy storage device not having an insufficient amount of stored electrical energy desires to supply power to another user. The information providing unit 46 is an example of a transmission unit configured to transmit insufficiency information including the position information and the communication address extracted by the first extraction unit to the communication address of the user of the portable electrical energy storage device not having an insufficient amount of stored electrical energy wishing to supply power to another user. By reflecting the wishes of the user in this manner, lending and borrowing of the portable electrical energy storage device 1 can be further promoted.

According to a sixth aspect, the portable electrical energy storage device 1 is provided. The server communication unit 35 and the communication circuit 16 are examples of a communication unit configured to communicate with a server device. The storage battery 12 is an example of an electrical energy storing unit. The remaining amount sensor 14 is an example of a measuring unit configured to measure the amount of stored electrical energy of the electrical energy storing unit. The GPS receiver 13 is an example of a positioning unit configured to find a geographic position. The server communication unit 35 and the communication circuit 16 may transmit, to a server device, status information indicating the electrical energy storage status measured by the measuring unit and the position information indicating the position found by the positioning unit. In this way, lending and borrowing of the portable electrical energy storage device 1 can be further promoted.

According to a seventh aspect, a program executed at the communication terminal is provided, the program including an authentication module for executing authentication processing by transmitting authentication information to a server device; a transmission unit configured to transmit, to the server device, status information indicating an electrical energy storage status of a portable electrical energy storage device and position information indicating a geographic location; and a reception unit configured to receive a communication address or position information of a user of a portable electrical energy storage device not having an insufficient amount of stored electrical energy in the case in which an amount of stored electrical energy of a portable electrical energy storage device is insufficient, and receives a communication address or position information of a user of a portable electrical energy storage device with an insufficient amount of stored electrical energy in the case in which an amount of stored electrical energy of a portable electrical energy storage device is not insufficient. In this way, lending and borrowing of the portable electrical energy storage device 1 can be further promoted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A system comprising:
a server device; and
a plurality of portable electrical energy storage devices, wherein
the server device includes:
   an acquisition unit configured to acquire status information indicating an electrical energy storage status of each one of the plurality of portable electrical energy storage devices and position information indicating a geographic position of each one of the plurality of portable electrical energy storage devices;
   a user database configured to associate the status information and the position information acquired by the acquisition unit with a communication address and store the status information, the position information and the communication address;
   a first extraction unit configured to extract, from the user database, a first position information as the position information or a first communication address associated with a first position information as the communication address of a first portable electrical energy storage device which is a portable electrical energy storage device having an insufficient amount of stored electrical energy on the basis of the status information among the plurality of portable electrical energy storage devices;
   a second extraction unit configured to extract, from the user database, a second communication address as the communication address of a second portable electrical energy storage device which is a portable electrical energy storage device having a non-insufficient amount of stored electrical energy on the basis of the status information among the plurality of portable electrical energy storage devices; and
   a transmission unit configured to transmit insufficiency information including the first position information or the first communication address associated with the first position information extracted by the first extraction unit to the second communication address extracted by the second extraction unit;
wherein each one of the plurality of portable electrical energy storage devices includes:
   a communication unit configured to communicate with the server device;
   an electrical energy storing unit;
   a measuring unit configured to measure an amount of stored electrical energy of the electrical energy storing unit; and
   a positioning unit configured to find a geographic position,
wherein the communication unit is further configured to transmit, to the server device, the status information indicating the amount of stored electrical energy measured by the measuring unit as the electrical energy storage status and the position information indicating the geographic position found by the positioning unit, and
wherein the insufficiency information transmitted to the second communication address of the second portable electrical energy storage device includes the first position information or the first communication address of the first portable electrical energy storage device which is to be used for receiving the electrical energy from the second portable electrical energy storage device which makes a pair with the first portable electrical energy storage device and other first position information or other first communication address of other first portable electrical energy storage device extracted by the first extraction unit which is not to be used for receiving the electrical energy from the second portable electrical energy storage device, and the other first portable electrical energy storage device is different from the first portable electrical energy storage device which is to be used for receiving the electrical energy from the second portable electrical energy storage device, and
the second communication address of the second portable electrical energy storage device to which the insufficiency information is transmitted includes the second communication address of the second portable electrical energy storage device which is to be used for supplying the electrical energy to the first portable electrical energy storage device which makes a pair with the second portable electrical energy storage device and other second communication address of other second portable electrical energy storage device extracted by the second extraction unit which is not to be used for supplying the electrical energy to the first portable electrical energy storage device.

2. The system according to claim 1, wherein
the second extraction unit preferentially extracts a second position information as the position information or the second communication address associated with the second position information of the second portable electrical energy storage device located at a position close to a position indicated by the first position information on the basis of the first position information associated with the first position information extracted by the first extraction unit and the second position information.

3. The system according to claim 1, wherein
the second extraction unit preferentially extracts position information or a communication address associated with a position information of a portable electrical energy storage device having a high amount of the stored electrical energy on the basis of status information of the portable electrical energy storage device.

4. The system according to claim 1, further comprising:
a third extraction unit configured to extract, from the user database, a third communication address as the communication address of a third portable electrical energy storage device having an insufficient amount of the stored electrical energy on the basis of the status information;
a query unit configured to transmit a query message to the third communication address for inquiring as to whether or not supply of power received from another portable electrical energy storage device is desired by the third portable electrical energy storage device;
a reception unit configured to receive a response to the query message; and
a determining unit configured to determine whether or not the supply of power from the another portable electrical energy storage device is desired by the third portable electrical energy storage device on the basis of the response;

wherein the transmission unit transmits, when the determining unit determines that the supply of power from the another portable electrical energy storage device is desired by the third portable electrical energy storage device, insufficiency information including a third position information as the position information of the third portable electrical energy storage device or the third communication address associated with a third position information to the second communication address extracted by the second extraction unit.

5. The system according to claim 1, wherein the second extraction unit preferentially extracts a second position information as the position information of the second portable electrical energy storage device, and the second further comprises:

a query unit configured to transmit a query message to the second communication address associated with the second position information extracted by the second extraction unit for inquiring as to whether or not supply of power to the first portable electrical energy storage device is desired by the second portable electrical energy storage device, a reception unit configured to receive a response to the query message, and a determining unit configured to determine whether or not the supply of power to the first portable electrical energy storage device is desired by the second portable electrical energy storage device on the basis of the response;

wherein the first extraction unit extracts, from the user database, the first position information or the first communication address associated with the first position information in a case in which the supply of power to the first portable electrical energy storage device is desired by the second portable electrical energy storage device, and the transmission unit transmits the insufficiency information including the first position information or the first communication address associated with the first position information to the second communication address.

6. The system according to claim 1, wherein the insufficiency information includes desire-to-borrow information.

7. The system according to claim 6, wherein the insufficiency information includes information indicating that the first portable electrical energy storage device has an insufficient amount of stored electrical energy.

8. The system according to claim 1, wherein a display of the second portable electrical energy storage device or a display of a communication terminal connected to the server via a network displays the first position information or the first communication address of the first portable electrical energy storage device and the other first position information or the other first communication address of the other first portable electrical energy storage device.

9. A portable electrical energy storage device, comprising:

a communication unit configured to communicate with a server device;

an electrical energy storing unit;

a measuring unit configured to measure an amount of stored electrical energy of the electrical energy storing unit; and a positioning unit configured to find a geographic position, wherein the communication unit transmits, to the server device, status information indicating the amount of stored electrical energy measured by the measuring unit and position information indicating the geographic position found by the positioning unit, and the status information causes the server device to:

extract, from a user database of the server device, a first position information or a first communication address associated with a first position information of a first portable electrical energy storage device having an insufficient amount of stored electrical energy on the basis of the status information among a plurality of portable electrical energy storage devices;

extract, from the user database, a second communication address of a second portable electrical energy storage device having a non-insufficient amount of stored electrical energy on the basis of the status information among the plurality of portable electrical energy storage devices; and transmit insufficiency information including the first position information or the first communication address associated with the first position information extracted by server device to the second communication address extracted by the server device, wherein the insufficiency information transmitted to the second communication address of the second portable electrical energy storage device includes the first position information or the first communication address of the first portable electrical energy storage device which is to be used for receiving the electrical energy from the second portable electrical energy storage device which makes a pair with the first portable electrical energy storage device and other first position information or other first communication address of other first portable electrical energy storage device which is not to be used for receiving the electrical energy from the second portable electrical energy storage device, and the other first portable electrical energy storage device is different from the first portable electrical energy storage device which is to be used for receiving the electrical energy from the second portable electrical energy storage device, and the second communication address of the second portable electrical energy storage device to which the insufficiency information is transmitted includes the second communication address of the second portable electrical energy storage device which is to be used for supplying the electrical energy to the first portable electrical energy storage device which makes a pair with the second portable electrical energy storage device and other second communication address of other second portable electrical energy storage device which is not to be used for supplying the electrical energy to the first portable electrical energy storage device.

10. The portable electrical energy storage device according to claim 9, wherein the communication unit transmits the status information indicating the amount of stored electrical energy of the portable electrical energy storage device and the position information indicating the geographic position via a communication terminal connected to the server device.

11. The portable electrical energy storage device according to claim 9, wherein the portable electrical energy storage device is carried by a human user with a hand, and the portable electrical energy storage device comprises a power outlet configured to supply electrical energy of the electrical energy storing unit to an external electric device connecting with the power outlet.

12. A system for promoting lending and borrowing of portable electrical energy storage devices, the system comprising:

a server; and a plurality of portable electrical energy storage devices, wherein the server includes:

one or more processors configured to acquire status information indicating an amount of stored electrical energy of each one of the plurality of portable electrical energy storage devices and position information indicating a geographic position of each one of the plurality of portable electrical energy storage devices;

a user database configured to associate the status information and the position information acquired by the one or more processors with a communication address and store the status information, the position information and the communication address; and a first communication circuitry connected to the one or more processors, wherein the one or more processors are further configured to:

extract, from the user database, a first position information as the position information or a first communication address associated with a first position information as the communication address of a first portable electrical energy storage device which is a portable electrical energy storage device having an insufficient amount of stored electrical energy on the basis of the status information among the plurality of portable electrical energy storage devices;

extract, from the user database, a second communication address as the communication address of a second portable electrical energy storage device which is a portable electrical energy storage device having a non-insufficient amount of stored electrical energy on the basis of the status information among the plurality of portable electrical energy storage devices; and the first communication circuitry is configured to transmit insufficiency information including the first position information or the first communication address associated with the first position information extracted by the one or more processors to the second communication address extracted by the one or more processors, and each one of the plurality of portable electrical energy storage devices includes:

a second communication circuitry configured to communicate with the server;

an electrical energy storing unit;

a sensor configured to sense an amount of stored electrical energy of the electrical energy storing unit; and a positioning circuitry configured to find a geographic position, wherein the second communication circuitry is further configured to transmit, to the server, the status information indicating the amount of stored electrical energy sensed by the sensor and the position information indicating the geographic position found by the positioning circuitry, and wherein the insufficiency information transmitted to the second communication address of the second portable electrical energy storage device includes the first position information or the first communication address of the first portable electrical energy storage device which is to be used for receiving the electrical energy from the second portable electrical energy storage device which makes a pair with the first portable electrical energy storage device and other first position information or other first communication address of other first portable electrical energy storage device extracted by the one or more processors which is not to be used for receiving the electrical energy from the second portable electrical energy storage device, and the other first portable electrical energy storage device is different from the first portable electrical energy storage device which is to be used for receiving the electrical energy from the second portable electrical energy storage device, and the second communication address of the second portable electrical energy storage device to which the insufficiency information is transmitted includes the second communication address of the second portable electrical energy storage device which is to be used for supplying the electrical energy to the first portable electrical energy storage device which makes a pair with the second portable electrical energy storage device and other second communication address of other second portable electrical energy storage device extracted by the one or more processors which is not to be used for supplying the electrical energy to the first portable electrical energy storage device.

\* \* \* \* \*